(12) United States Patent
Tursky et al.

(10) Patent No.: US 12,458,162 B1
(45) Date of Patent: Nov. 4, 2025

(54) UTILITY HOLDER

(71) Applicants: John M. Tursky, Hillsborough, NJ (US); Harikrushna Patel, Secaucus, NJ (US)

(72) Inventors: John M. Tursky, Hillsborough, NJ (US); Harikrushna Patel, Secaucus, NJ (US)

( * ) Notice: Subject to any disclaimer, the term of this patent is extended or adjusted under 35 U.S.C. 154(b) by 0 days.

(21) Appl. No.: 18/747,848

(22) Filed: Jun. 19, 2024

(51) Int. Cl.
*A47G 23/02* (2006.01)
*F16M 13/02* (2006.01)

(52) U.S. Cl.
CPC ......... *A47G 23/0241* (2013.01); *F16M 13/02* (2013.01); *F16M 2200/028* (2013.01)

(58) Field of Classification Search
CPC ............... A47G 23/0241; F16M 13/02; F16M 2200/028
USPC ........ 248/274.1, 283.1, 295.11, 297.21, 509; 222/180–183
See application file for complete search history.

(56) References Cited

U.S. PATENT DOCUMENTS

| | | | | |
|---|---|---|---|---|
| 1,041,710 | A * | 10/1912 | Downey | B21D 28/34 83/613 |
| 8,141,836 | B2 * | 3/2012 | Saez | F16M 13/02 248/295.11 |
| 8,678,328 | B2 * | 3/2014 | Smith | F21V 21/0885 248/316.1 |
| 9,155,428 | B2 | 10/2015 | Haworth | |
| 9,770,141 | B2 * | 9/2017 | Wegelin | A47K 5/1217 |
| 10,750,911 | B2 * | 8/2020 | McDonagh | A47K 5/12 |
| 11,857,126 | B2 * | 1/2024 | Bing | A47K 5/1205 |
| 11,918,158 | B2 * | 3/2024 | Steinmetz | F16M 13/02 |
| 12,070,167 | B2 * | 8/2024 | Rossi | A47K 5/1205 |
| 12,215,820 | B1 * | 2/2025 | Hirstein | F16M 11/041 |
| 12,376,711 | B2 * | 8/2025 | Steinmetz | B05B 12/004 |
| 2004/0108337 | A1 * | 6/2004 | Makino | A47K 5/12 222/183 |

(Continued)

FOREIGN PATENT DOCUMENTS

CN 217524880 U 10/2022
DE 102020105278 A1 9/2021
(Continued)

OTHER PUBLICATIONS

Sentinel ½ gallon hand sanitizer dispenser countertop—https://www.Laffertyequipment.com/products/976936-C.

*Primary Examiner* — Muhammad Ijaz
(74) *Attorney, Agent, or Firm* — Ernest D. Buff & Associates, LLC; Ernest D. Buff (57) ABSTRACT

A utility holder (100) for a soap dispenser comprises an enclosure (102) adapted to mount on a wall. The holding bracket (106), attached at the bottom end (110) of the enclosure (102), accommodates a soap dispenser. Fixture clamp (104), fastened at the top end (110) of the enclosure (102), clamps the soap dispenser. A locking mechanism installed in the enclosure (102) includes an inner tube (200) fitted with a magnetic block (202). The magnetic block (202) is coupled with a centrally pivoted lever (204) through its end portion. Movement of the magnetic block (202) reciprocates laterally the centrally pivoted lever (204) to engage/disengage a secondary lever (206) with a linear ratchet (208) installed in the enclosure (102). The height of the holder (100) is thereby locked according to the dimensions of the soap dispenser.

11 Claims, 5 Drawing Sheets

(56) References Cited

U.S. PATENT DOCUMENTS

| | | | |
|---|---|---|---|
| 2005/0017146 A1* | 1/2005 | Kringel | A47F 7/283 |
| | | | 248/313 |
| 2014/0158714 A1* | 6/2014 | Snodgrass | A47K 5/1217 |
| | | | 222/183 |
| 2016/0040455 A1* | 2/2016 | Limbert | A47K 5/1211 |
| | | | 222/153.09 |
| 2018/0153354 A1* | 6/2018 | Beckerman | B05B 11/0054 |
| 2022/0225845 A1* | 7/2022 | Steinmetz | B05B 12/004 |
| 2023/0235849 A1* | 7/2023 | Chen | F16M 13/022 |
| | | | 248/274.1 |
| 2023/0263280 A1* | 8/2023 | Lin | A45C 11/00 |
| | | | 248/274.1 |
| 2024/0099519 A1* | 3/2024 | Runius | F16M 13/02 |

FOREIGN PATENT DOCUMENTS

| | | |
|---|---|---|
| EP | 1325700 A1 | 7/2003 |
| WO | WO2019063172 A1 | 4/2019 |

* cited by examiner

UTILITY HOLDER

BACKGROUND OF THE INVENTION

1. Field of the Invention

The present invention pertains to the field of utility items; and, more particularly, to a utility holder such as a soap dispenser or backyard golf net that is specifically designed to hold and secure different equipment or items having different designs and dimensions.

2. Description of the Prior Art

Utility holders comprise versatile and practical solutions designed to securely store and organize a variety of items, including household or recreational equipment. These holders come in various forms, such as wall-mounted racks, adhesive hooks, and freestanding stands, tailored to different environments and needs. Made from durable materials like stainless steel, plastic, or rubber, they ensure stability and longevity. Their design often includes features like adjustable arms or non-slip surfaces to accommodate items of different sizes and weights. By keeping items neatly arranged and easily accessible, utility-type holders enhance the functionality of spaces and contribute to a more organized and efficient living or working environment.

For example, a soap dispenser holder is often used in various domestic as well as public facilities, such as homes, schools, offices, hotels, restaurants, and many more, to accommodate a liquid soap dispenser. The purpose of utilizing the soap dispenser holder is to secure the liquid soap dispenser in a specific place to avoid spillage, to provide convenience to individuals while using the soap dispenser, and to maintain hygiene standards. Conventional soap dispenser holders are available in different shapes and sizes in the market. Such holders possess a fixed structure and, therefore, can accommodate only a specific size of liquid soap dispenser.

Known dispenser holders do not provide any room for adjustment of the size corresponding to the dispenser's dimensions. To accommodate varying-sized dispensers, one must replace the holder corresponding to the size of the dispenser, which increases costs. Further, the existing designs of soap dispenser holders inadequately safeguard the liquid soap dispenser against unauthorized removal by individuals. This becomes particularly crucial in public or shared facilities where preventing unauthorized usage by strangers is essential for upholding hygiene standards and managing expenses effectively.

United States Patent Publication U.S. Pat. No. 11,918,158B2 discloses a product dispenser holder having a holder body designed to accommodate a product dispenser containing the product to be dispensed. The holder body includes an actuation sensor to detect activations of the product dispenser, along with an actuation button. When pressure is applied to the dispenser's pump, it exerts a downward force on the actuation button, causing it to rotate downward and trigger the actuation sensor, generating a signal indicating dispenser activation.

Such known utility holders are mainly focused on providing a holder that ensures user convenience during soap dispensing. However, such soap dispensers fail to address the crucial aspect of safeguarding the attached dispenser against unauthorized access. Additionally, they do not incorporate size adjustment features. There accordingly exists a need in the art to develop a multi-utility holder that not only addresses the above-mentioned limitations pertaining to soap dispensers but also serves to securely hold many other household and/or recreational items.

OBJECTIVES OF THE INVENTION

An objective of the present invention is to develop a holder for soap dispensers that secures the liquid soap dispenser in an upright position to avoid or eliminate the spillage of liquid soap, thereby reducing wastage.

Another objective of the present invention is to prevent the unauthorized removal of liquid soap dispensers in public facilities, thereby preventing the risks of theft.

Another objective of the present invention is to provide a holder that is adaptable to accommodate various-sized soap dispensers, thereby eliminating the need for a specific holder corresponding to the size of the soap dispenser.

Another objective of the present invention is to provide convenience to individuals while utilizing the liquid soap dispenser.

Yet another objective of the present invention is to develop a holder that has an ergonomic design, ensuring space optimization

SUMMARY OF THE INVENTION

The present invention provides an adjustable soap dispenser holder that not only prevents unauthorized removal of the soap dispensers, but can accommodate various-sized soap dispensers without restricting them to a single fixed size.

According to an embodiment of the present invention, a utility holder for a soap dispenser includes an enclosure adapted to mount on a wall. A holding bracket is attached at a bottom end of the enclosure to accommodate a liquid soap dispenser. A fixture clamp is fastened at a top end of the enclosure for clamping the soap dispenser and a locking mechanism is incorporated within the enclosure. The locking mechanism comprises an inner tube inserted within the enclosure. The inner tube is incorporated with a magnetic block, coupled with an end of a centrally pivoted lever installed in the inner tube. The block moves back and forth in a lateral direction, thereby reciprocating the centrally pivoted lever to engage/disengage a secondary lever with a linear ratchet installed inside the enclosure. When engaged, the centrally pivoted lever locks the height of the utility holder, which can be adjusted in accordance with the dimensions of the soap dispenser to be accommodated.

In an embodiment, the enclosure has a hollow rectangular-shaped structure.

In an embodiment, the ratchet comprises a plurality of teeth that are adapted to be engaged with a pawl formed at the edge of the secondary lever.

In an embodiment, the magnetic block is made of a metallic material.

In an embodiment, the dimensions of the liquid soap dispenser refer to the height of the soap dispenser.

In an embodiment, the fixture clamp has a semi-circular shape.

In an embodiment, the enclosure further comprises a spring, exerting force on the secondary lever to engage the secondary lever with a ratchet, thereby locking the height of the holder.

In an alternate embodiment, the holding bracket is size adjustable to allow the accommodation of a wine bottle.

In another alternate embodiment, the fixture clamp has a circular shape for holding the neck of the wine bottle.

BRIEF DESCRIPTION OF THE DRAWINGS

The invention will be more fully understood, and further advantages will become apparent when reference is had to the following detailed description and the accompanying drawings, in which.

DETAIL DESCRIPTION OF THE INVENTION

The embodiments herein and the various features and advantageous details thereof are explained more fully with reference to the non-limiting embodiments that are illustrated in the accompanying drawings and the following description. Numerous variations, changes, and substitutions may occur to those skilled in the art without departing from the invention. It should be understood that various alternatives to the embodiments of the present disclosure herein may be employed.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms used in the application, as all equivalents, synonyms, new developments, and terms or techniques that serve the same or a similar purpose are considered to be within the scope of the present claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The present invention relates to a utility holder capable of facilitating the accommodation of liquid soap dispensers of various sizes while optimizing the space requirements and preventing unauthorized removal of the soap dispensers.

Figure 1A:
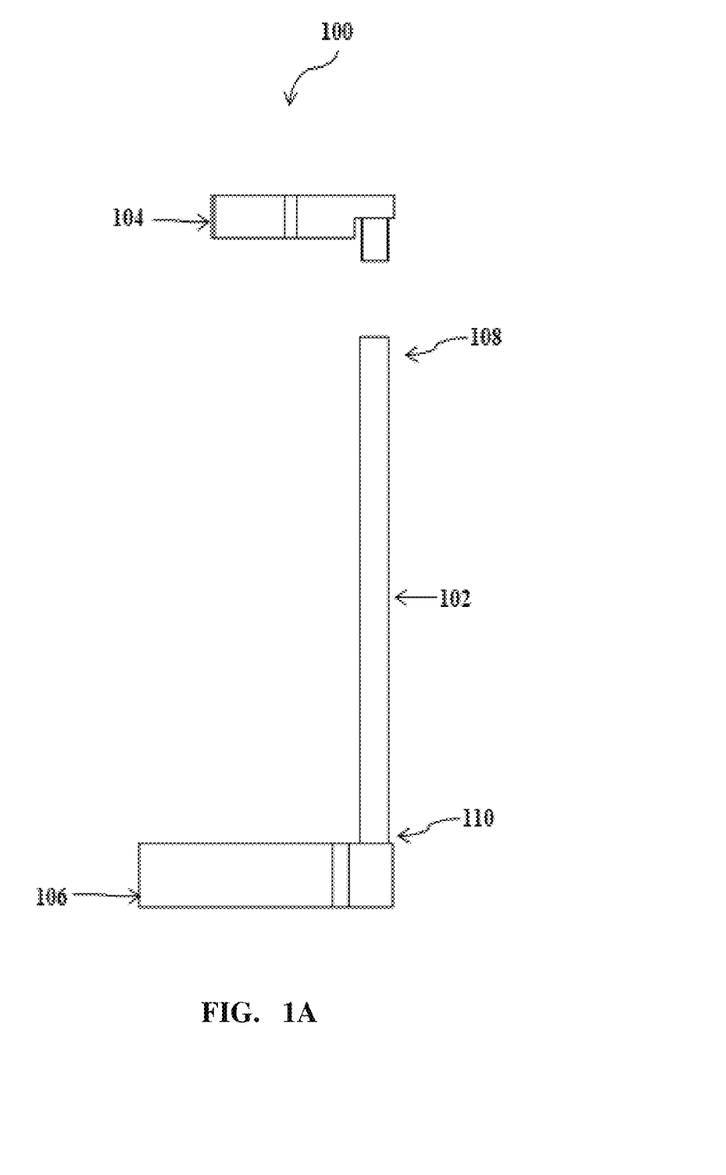
FIGS. 1A-1B illustrate different views of a utility holder for soap dispensers in accordance with an embodiment of the present invention.
Figure 1B:
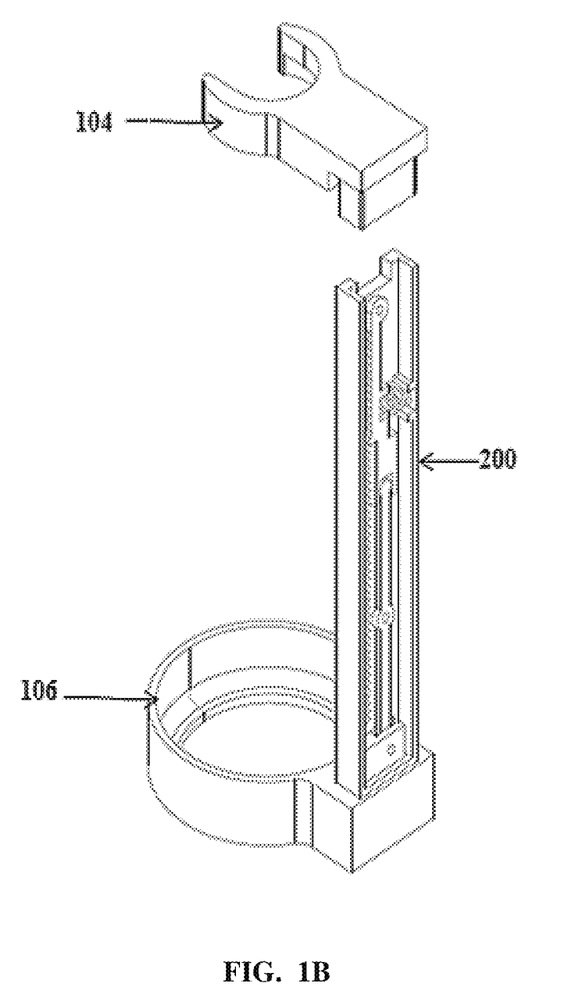

FIGS. 1A-1B illustrate different views of a utility holder for the soap dispenser. Herein, the holder 100 comprises an enclosure 102 affixed with a fixture clamp 104 and a holding bracket 106. Enclosure 102 is a hollow tube that possesses a cuboidal-shaped structure and is adapted to be mounted on a wall. The Enclosure 102 includes a top-end 108 and a bottom-end 110. At the top end 108, the fixture clamp 104 is affixed, while at the bottom end 110, the holding bracket 106 is attached via an inner tube 200 (as illustrated in FIGS. 1B and 2) of the holder 100.

The enclosure 102 envelops the inner tube 200 and various internal components associated with the holder 100. Further, enclosure 102 joins the fixture clamp 104 and holding bracket 106 in a manner that the fixture clamp 104 and holder 100 collaboratively grip the soap dispenser therebetween. In an embodiment, the fixture clamp 104 comprises a semi-circular shape that facilitates a convenient as well as firm grip on the soap dispenser.

Figure 2:
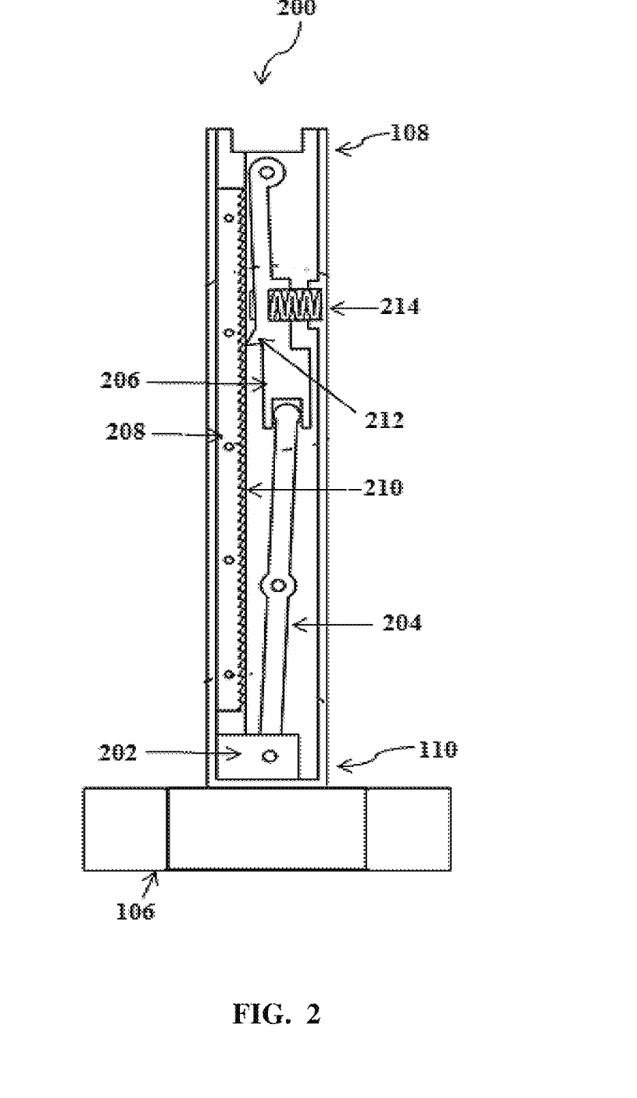
FIG. 2 illustrates an internal view of the utility holder for the soap dispenser of FIGS. 1A-1B, in accordance with an embodiment of the present invention.

FIG. 2 illustrates a back view of holder 100, showing various internal components associated with holder 100. Here, FIG. 2 presents a locking mechanism installed in the inner tube 200. The locking mechanism comprises a magnetic block 202 coupled with an end of a centrally pivoted lever 204, pivoted with the inner tube 200. A secondary lever 206 has an end engaged with the centrally pivoted lever 204. A linear ratchet 208 is installed within enclosure 102 and comprises a plurality of teeth 210 that are adapted to be engaged with the secondary lever 206 through a pawl 212 formed at an edge of the secondary lever 206. A spring 214 is provided in connection with the secondary lever 206 and inner tube 200. This configuration of the inner tube 200 with all the relevant components of the locking mechanism forms a sub-assembly within the enclosure 102.

The inner tube 200 is the internal key component of the holder 100 and is adapted to be inserted inside enclosure 102. The inner tube 200 has different shaped structures, including rectangular, cuboidal, and the like, which provide a base for all the internal components of the holder 100. In an embodiment, the inner tube 200 comprises a hollow and/or rigid structure.

Further, the inner tube 200 is provided with the holding bracket 106, attached at an end of the inner tube 200, such that the holding bracket 106, on insertion of inner tube 200 inside the enclosure 102, comes in proximity to the bottom end 110 of enclosure 102 (as shown in FIG. 1B). The holding bracket 106 is adapted to accommodate the liquid soap dispenser. In an embodiment, the shape of the holding bracket 106 is a circular plate-like structure. In another embodiment, the shape of the holding bracket 106 is a ring-like structure (as illustrated in FIG. 1B).

Further, the inner tube 200 comprises a locking mechanism that allows to adjust and lock the height of the holder 100. The locking mechanism comprises the magnetic block 202, made up of a metallic material that includes steel and iron. The magnetic block 202 actuates the locking mechanism upon contact with a magnetic key 216 by an authorized user. The magnetic key 216 refers to a magnetized entity designed to attract the magnetic block 202 to slide or move the magnetic block 202 laterally towards or away from the inner tube 200, inside enclosure 102. The lateral motion of the magnetic block 202 locks or unlocks the height of the holder 100. The lateral sliding of the magnetic block 202 depends on whether or not the authorized user causes the metallic key 216 to be in contact with magnetic block 202. In an embodiment, the magnetic block 202 has a cubical shape.

The magnetic block 202 is coupled with the end portion of the centrally pivoted lever 204. Due to the lateral movement of the magnetic block 202, the centrally pivoted lever 204 reciprocates laterally, corresponding to the movement of the magnetic block 202. The reciprocating of the centrally pivoted lever 204 tends to move the secondary lever 206 installed in the inner tube 200. The secondary lever 206 is configured in a manner that the end portion of the secondary lever 206 becomes engaged with the centrally pivoted lever 204 (as illustrated in FIG. 2).

The engagement of both levers 204 and 206 leads to the actuation of the secondary lever 206 to engage with the linear ratchet 208 installed in the enclosure 102. The secondary lever 206 comprises the pawl 212 that engages with the plurality of teeth 210 of linear ratchet 208. The pawl 212 is a conical tooth-like profile formed at an edge of the secondary lever 206, which comes in proximity to the ratchet 208 in accordance with the lateral movement of the magnetic block 202 and centrally pivoted lever 204. The pawl 212 is configured to latch the plurality of teeth 210 of the ratchet 208 to securely fix the height of the holder 100. This design configuration enables the holder 100 to seamlessly allow the accommodation of liquid soap dispensers of various sizes.

Furthermore, the inner tube 200 comprises the spring 214 which is provided in a connection with the secondary lever 206 and inner tube 200. The spring 214 is configured to apply a pushing force on the secondary lever 206 against the ratchet 208 only when the magnetic key 216 is not in contact with the block 202. Due to the applied pushing force, the pawl 212 of the secondary lever 206 comes in contact with the plurality of teeth 210 and gets engaged to latch linear ratchet 208 to adjust the height of the holder 100. In an embodiment, the spring 214 may be a compression spring.

Figure 3A:
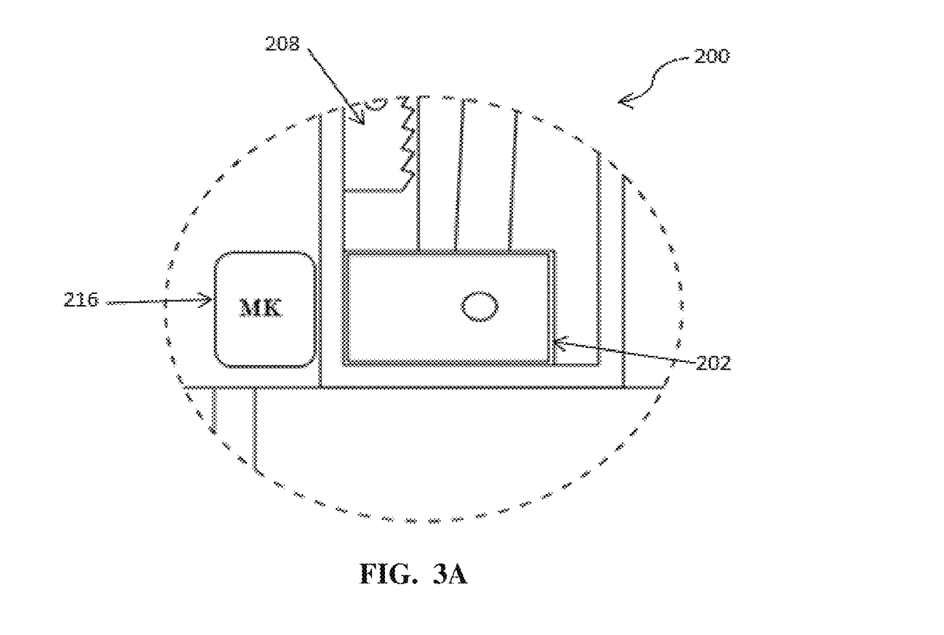
FIGS. 3A-3D illustrate a magnified view of the inner tube of the utility holder, showing an engaged or disengaged position of the linear ratchet in accordance with an embodiment of the present invention.
Figure 3B:
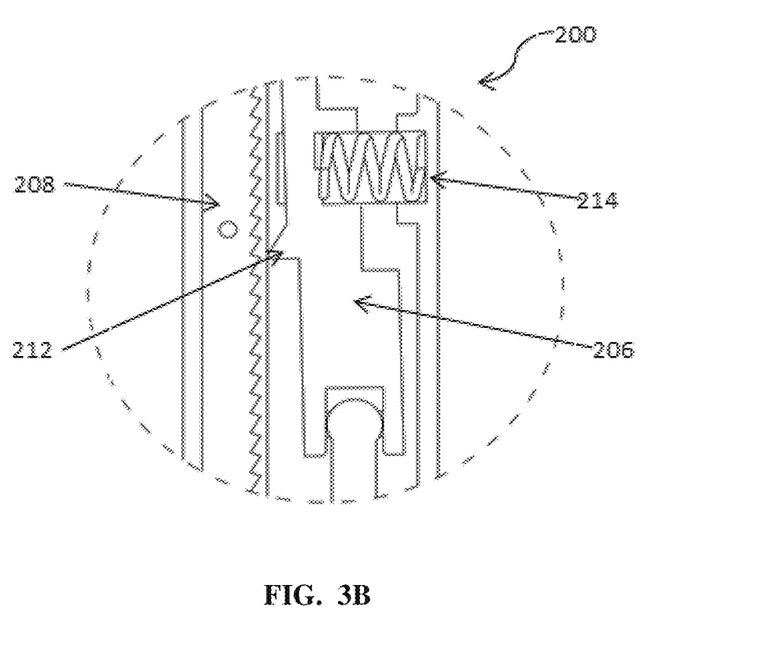

FIGS. 3A-3D illustrate a magnified view of the inner tube 200 of the holder 100 of the soap dispenser, showing an engaged or disengaged position of the linear ratchet 208. As shown in FIG. 3A-3B, as the authorized user positions the magnetic key 216 in proximity to the bottom end of enclosure 102 (as illustrated in FIG. 3A), then due to magnetic attraction, the magnetic block 202 is attracted toward the inner tube 200 and slides to a certain distance inside the inner tube 200. This sliding motion of the magnetic block 202 then actuates the centrally pivoted lever 204 to move away from the linear ratchet 208 (as illustrated in FIG. 2).

The movement of centrally pivoted lever 204 simultaneously actuates the secondary lever 206 to move apart from the ratchet 208 (as illustrated in FIG. 3B). This movement causes the spring 214 to compress and store the compression energy. Once the secondary lever 206 moves apart, the pawl 212 of the linear ratchet 208 disengages with the plurality of teeth 210 of the linear ratchet 208. The disengagement of the secondary lever 206 and the linear ratchet 208 unlocks the holder 100 (as illustrated in FIGS. 3A and 3B), enabling the authorized user to linearly position pawl 212 along the plurality of teeth 210 and thereby accommodate different sizes of liquid soap dispensers within the holding bracket 106.

Figure 3C:
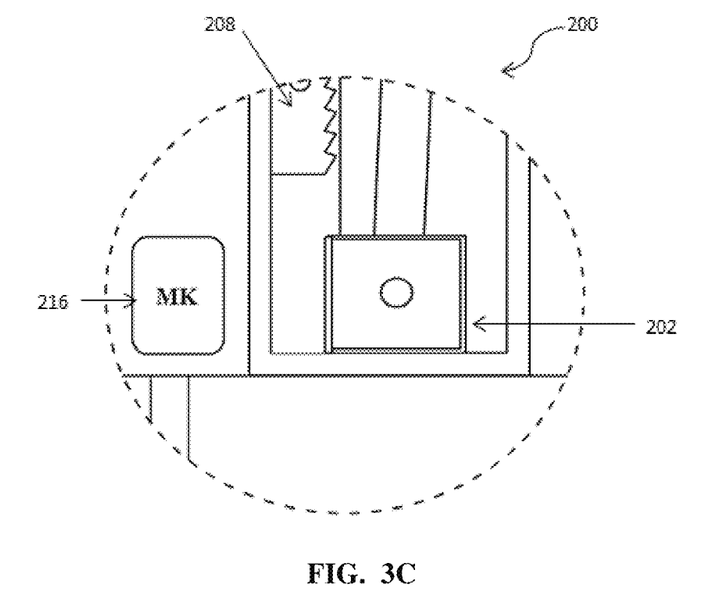

Likewise, for locking holder 100, when the authorized user removes the magnetic key 216 away from the bottom end 110 of enclosure 102, the magnetic block 202 gets detached from the magnetic attraction of the magnetic key 216 (as illustrated in FIG. 3C). The detachment of magnetic block 202 allows the spring 214 to expand and release the stored compression energy to apply the pushing force to the secondary lever 206. Due to the pushing force of spring 214, the secondary lever 206 actuates towards the linear ratchet 208 and results in the engagement of the pawl 212 with the plurality of teeth 210 of the linear ratchet 208.

Figure 3D:
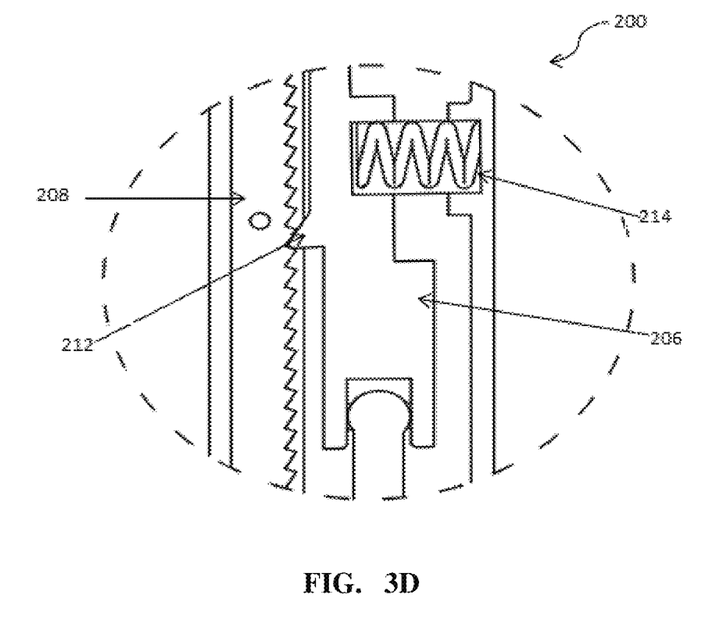

This, in turn, restricts the movement of the holding bracket 106 via the inner tube 200 (as illustrated in FIG. 3D) and locks the liquid soap dispenser between the holding bracket 106 and fixture clamp 104. Once the pawl 212 engages with the plurality of teeth 210 of the linear ratchet 208, the movement of secondary lever 206 simultaneously shifts the magnetic block 202 away from the inner tube 200 via the centrally pivoted lever 204 (as illustrated in FIG. 3D).

An alternative embodiment of the present invention, referred to as the wine lock, is designed to accommodate typical wine bottles. In this embodiment, the holding bracket 106 features a larger diameter to fit the standard 3-inch diametric dimensions of a wine bottle.

In a further aspect of the alternative embodiment, the fixture clamp 104 is designed to have a complete circular shape of around 1.250 inches in diameter, corresponding to the diametric dimension of the neck of the wine bottles. This, in turn, provides a firm grip on the fixture clamp 104 around the neck of the wine bottles.

In a further aspect of the alternative embodiment, the length of the wine lock may be adjustable up to 9 inches between the neck and the bottom portion of the bottle, which, in turn, allows the wine lock to accommodate different-sized wine bottles safely and securely.

Further, the configuration of the locking mechanism, in accordance with the above-mentioned embodiments, could be utilized with an adjustable backyard golf net, for adjusting the height configuration of the backyard golf net.

The foregoing description of the specific embodiments will so fully reveal the general nature of the embodiments herein that those skilled in the art can, by applying current knowledge, readily modify and/or adapt such specific embodiments for various applications without departing from the generic concept of the invention. Such adaptations and modifications are intended to fall within the scope of the invention, and the phraseology or the terminology employed herein is intended for descriptive purposes and not in a limiting sense. While the invention has been described in terms of preferred embodiments, those skilled in the art will recognize that these described embodiments can be practiced with modification within the spirit and scope of the appended claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A utility holder (100) for soap dispenser, comprising:
an enclosure (102) adapted to mount on a wall;
a holding bracket (106) attached at a bottom end (110) of said enclosure (102) to accommodate a soap dispenser;
a fixture clamp (104) fastened at a top end (110) of said enclosure (102) for clamping said soap dispenser; and
a locking mechanism incorporated within said enclosure (102), wherein said locking mechanism comprising an inner tube (200) installed with a magnetic block (202) coupled with an end of a centrally pivoted lever (204) such that movement of said block (202) reciprocates said centrally pivoted lever (204) to engage/disengage a secondary lever (206) with a linear ratchet (208) installed in said enclosure (102), via said centrally pivoted lever (204), to lock a height of said holder (100) according to dimensions of said soap dispenser.

2. The utility holder, as claimed in claim 1, wherein said enclosure (102) has a hollow rectangular-shaped structure.

3. The utility holder, as claimed in claim 1, wherein said ratchet (208) comprises a plurality of teeth (210).

4. The utility holder, as claimed in claim 3, wherein said plurality of teeth (210) is adapted to be engaged with a pawl (212) formed at an edge of said secondary lever (206).

5. The utility holder, as claimed in claim 1, wherein said block (202) moves back and forth in a lateral direction.

6. The utility holder, as claimed in claim 1, wherein said block (202) is made of a metallic material.

7. The utility holder, as claimed in claim 1, wherein dimensions of said soap dispenser define the height of said soap dispenser.

8. The utility holder, as claimed in claim 1, wherein said fixture clamp (104) has a semi-circular shape.

9. The utility holder, as claimed in claim 1, wherein said enclosure (102) further comprises a spring (214) that exerts a force on said secondary lever (206) towards said ratchet (208) to engage said secondary lever (206) with said ratchet (208), thereby locking said height of said holder (100).

10. The utility holder, as claimed in claim 1, wherein said holding bracket (106) is size adjustable to accommodate a wine bottle having a neck.

11. The utility holder, as claimed in claim 10, wherein said fixture clamp (104) has a circular shape for holding the neck of said wine bottle.

\* \* \* \* \*